United States Patent [19]

Brown et al.

[11] 4,095,440
[45] Jun. 20, 1978

[54] AIR BLOWER MOUNTING ASSEMBLY

[75] Inventors: William J. Brown, Naperville; William F. Legler, Sugar Grove, both of Ill.

[73] Assignee: Caterpillar Tractor Co., Peoria, Ill.

[21] Appl. No.: 775,333

[22] Filed: Mar. 7, 1977

Related U.S. Application Data

[63] Continuation of Ser. No. 622,912, Oct. 16, 1975, abandoned.

[51] Int. Cl.² ............................................. F25D 19/00
[52] U.S. Cl. ...................................... 62/450; 62/298; 180/54 A
[58] Field of Search ................. 62/244, 298, 299, 302, 62/303, 448, 449, 450; 98/2.11; 180/54 A

[56] References Cited

U.S. PATENT DOCUMENTS

| | | | |
|---|---|---|---|
| 2,247,028 | 6/1941 | Kuntz | 62/450 |
| 2,513,517 | 7/1950 | Reilly | 62/244 |
| 2,943,455 | 7/1960 | Reverman, Jr. | 62/450 |
| 3,031,862 | 5/1962 | Sherron | 62/449 |
| 3,116,614 | 1/1964 | King | 62/450 |
| 3,712,078 | 1/1973 | Maynard et al. | 62/448 |
| 3,844,202 | 10/1974 | Ferguson | 98/2.11 |

Primary Examiner—Ronald C. Capossela
Attorney, Agent, or Firm—Phillips, Moore, Weissenberger, Lempio & Majestic

[57] ABSTRACT

A vehicle cab includes a compartment in the lower portions thereof for mounting air conditioning machinery and the like, wherein the blowers of the air handling means are mounted on access doors to the compartment for providing a compact arrangement and improved access to the fan blowers and to machinery mounted behind the fans.

3 Claims, 2 Drawing Figures

AIR BLOWER MOUNTING ASSEMBLY

This is a continuation, of Ser. No. 622,912, filed Oct. 16, 1975, now abandoned.

BACKGROUND OF THE INVENTION

The present invention relates to the mounting of machinery within a compartment and pertains particularly to the mounting of fan blowers and the like for air handling equipment.

Earth working machinery and the like make increasing use of cabs for enclosing the operator compartment to enhance the comfort of the operator. Such vehicle cabs must enclose the operator compartment with the minimum amount of space and the minimum amount of interference with the operation of the vehicle. Such vehicle cabs must be relatively small in order not to interfere with the machinery of the vehicle. The cab must also provide maximum visibility to the operator for permitting him to easily and safely operate the vehicle.

The enclosing of the operator compartment is primarily for the purpose of enhancing the comfort and convenience of the operator and thus, heating and air conditioning systems are normally provided therefor. However, such heating and air conditioning equipment takes up space which is at a premium on such vehicles. Because of the lack of space available within the cabs of such vehicles, air conditioning and heating equipment is frequently mounted on the exterior of such cabs. Such exterior mounting of this equipment, however, is frequently unsightly and often interferes with normal operation of implements of the vehicle.

Such cabs frequently do not have sufficient space internally thereof by the mounting of such equipment

SUMMARY AND OBJECTS OF THE INVENTION

It is the primary object of the present invention to provide an optimum mounting arrangement of air handling equipment in a compartment of minimum space on a vehicle.

Another object of the present invention is to provide a compact and convenient mounting arrangement of air conditioning equipment within the equipment compartment of a vehicle.

A further object of the present invention is to provide a combination vehicle cab and accompanying air handling equipment compartment that is compact and efficiently arranged for easy access to all of the air conditioning equipment by mounting of the air handling fans on doors providing access and air inlet means for the equipment compartment.

In accordance with the primary aspect of the present invention, a compact and efficient arrangement of an air conditioning equipment compartment is provided in conjunction with a vehicle cab wherein portions of the equipment are mounted on the access doors to the equipment compartment to provide easy access thereto and to equipment therebehind and to provide an efficient utilization of compartment space.

BRIEF DESCRIPTION OF THE DRAWING

The above and other objects and advantages of the present invention will become apparent from the following description when read in conjunction with the drawings wherein.

DETAILED DESCRIPTION OF THE PREFERRED EMBODIMENT

Figure 1:
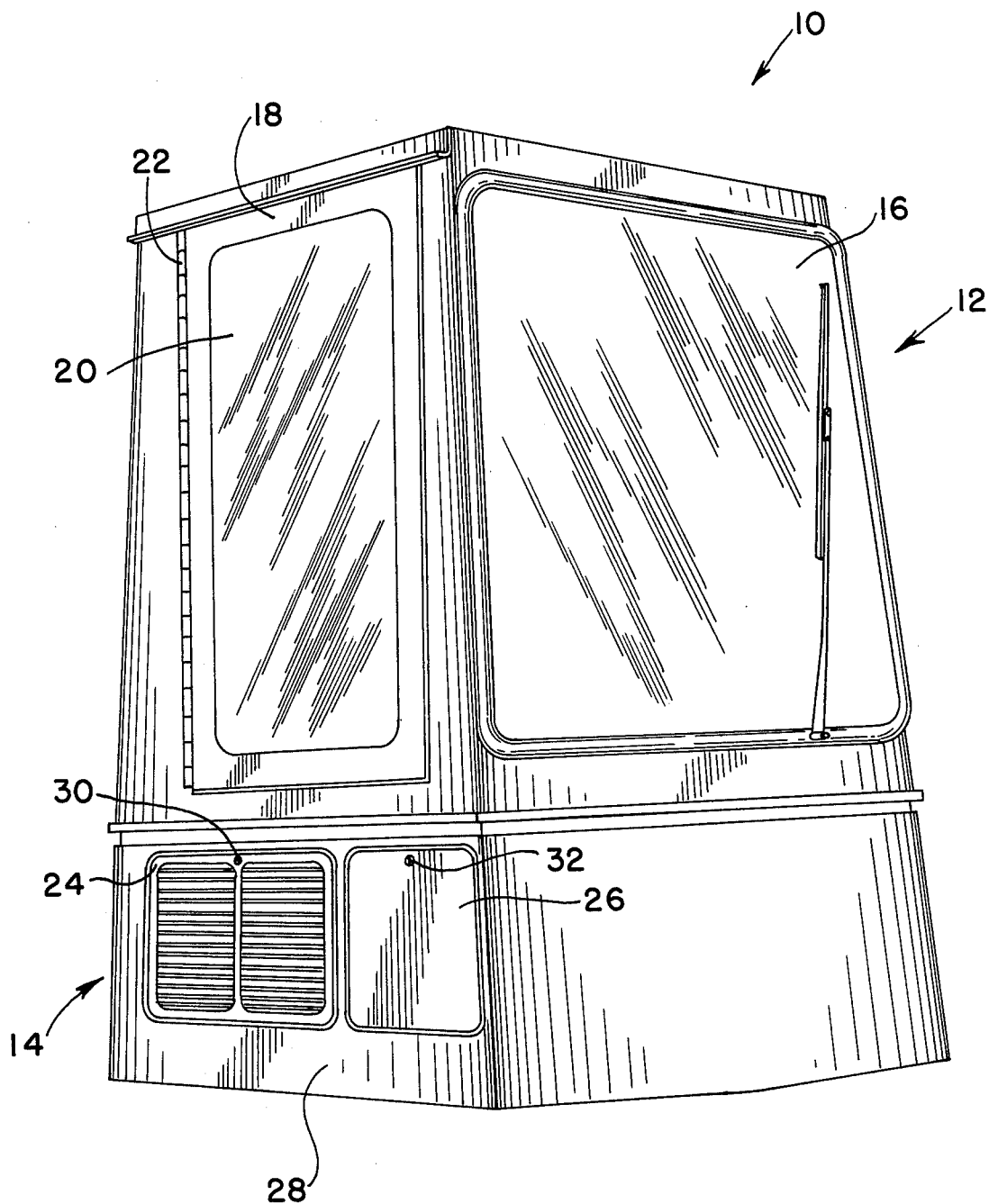
FIG. 1 is a perspective view of a vehicle cab embodying the present invention; and, FIG. 2 is a detailed view of a mounting arrangement in accordance with the present invention.

Turning now to the drawings and particularly FIG. 1, there is illustrated a vehicle cab generally designated by the numeral 10 comprising a housing generally defining or forming an operator compartment generally indicated at 12, and an air conditioning and/or heating equipment compartment designated generally by the numeral 14. The operator compartment is generally enclosed to provide an environmental cab that is appropriately heated or cooled as conditions require. The cab is designed to take up minimum space on the vehicle and to provide adequate room for the operator and to provide maximum visibility. In general, the housing includes a top connected to or appropriately combined with a front panel, two side panels and a rear panel to define the cab. The front panel includes a suitable windshield 16 of maximum dimensions to provide maximum visibility for the operator. The side panel includes a door 18 having a suitable glass or other transparent medium 20 comprising the major portion thereof to provide maximum visibility for the operator. The door 18 is suitably hinged at 22 to the side panel to provide access to the compartment by the operator.

As will be appreciated from the illustration in FIG. 1, the cab designated generally by the numeral 10 is of a functional design and encompasses the space required for serving its function. The cab is of the type for use on earth moving vehicles and other tractor type vehicles. Such vehicles normally have numerous implements and controls mounted thereon for performing its function. Accordingly, space is at a premium on such vehicles such that space for a cab and other auxiliary equipment such as air circulating blowers, heaters, or conditioners for the comfort of the operator must be arranged and positioned to perform their functions without interfering with the normal operation of the vehicle.

With this background in mind it will be appreciated that the cab of FIG. 1 is designed to accomodate a heating and/or air conditioning system by providing a suitable enclosed compartment for such equipment. In accordance with the present invention, this equipment is mounted in a manner to optimize the space utilization therein and the convenience of maintenance thereon.

The heating and air conditioning equipment compartment designated generally by the numeral 14 is formed in a portion of the cabin 10 and may be formed in one or more sides thereof. In any event, minimum space is available for such equipment. The equipment, therefore, must be placed within the compartment to properly function and to be accessible for maintenance and the like.

Figure 2:
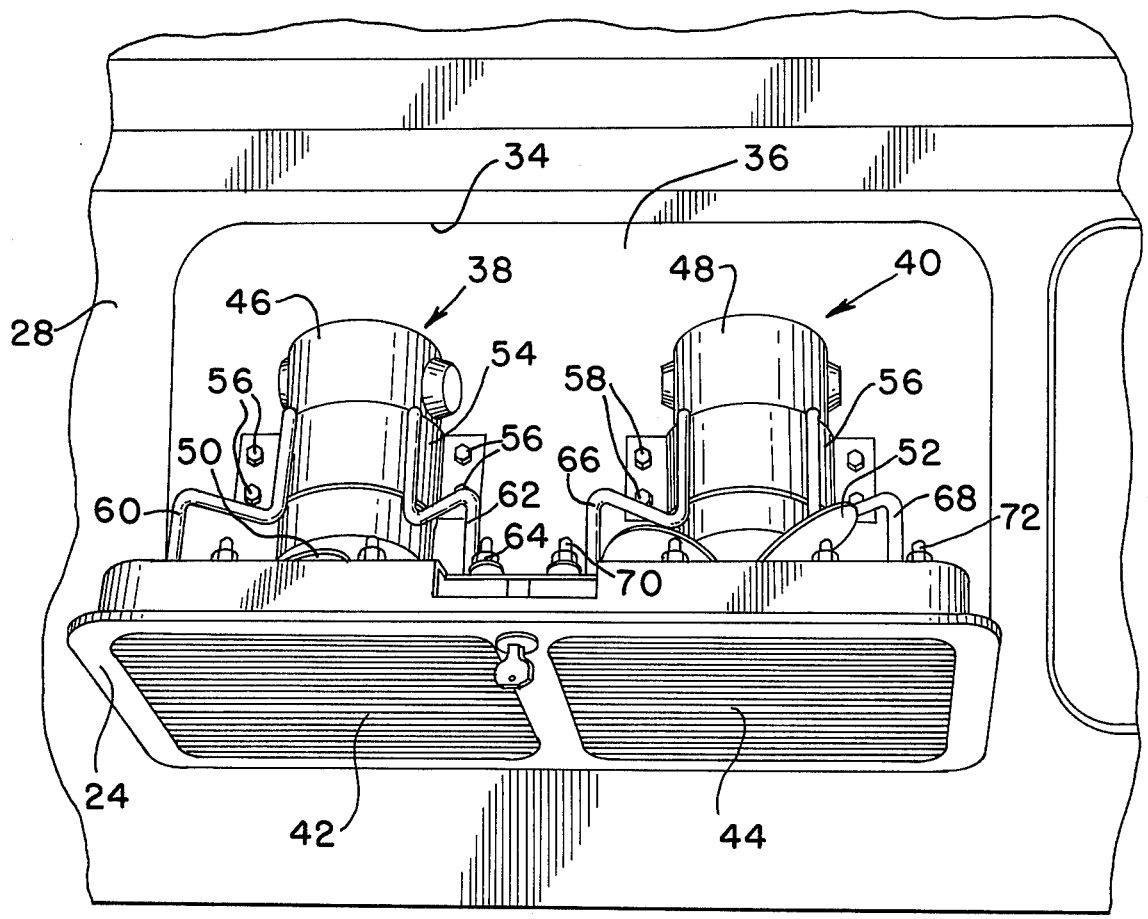

Access to the compartment is provided by first and second access doors 24 and 26 one or more of which may also serve as vent or air inlet or outlet for the compartment. These doors are hinged or pivotally secured in a suitable manner to a side panel 28 of the housing generally. The doors 24 and 26 are preferably hinged at the lower edges and include suitable latch or lock means indicated at 30 and 32 for securing or locking the doors in a closed position. The access door 24, as best seen in FIG. 2, encloses a substantially rectangular opening 34 in the side panel 28. The door is also slotted and lowered to permit air flow therethrough. This access opening 34 provides access to the equipment compartment 36 defined by the housing generally and the side panel 28.

Within this compartment 36 is suitably mounted such equipment as cooling or evaporator coils and the condensing coils of an air conditioning system. Also mounted within this area may be such items as air circulating blowers, heating coils, wiring harnesses, fuses and the like.

Such equipment within the compartment 36 must be suitably secured to the walls or the floor of the compartment or to suitable mounting bracket or the like secured thereto. For purposes of servicing and on other types of maintenance, these items of equipment must be mounted to be accessible from one or more of the access doors.

In order to increase the mounting space available and the accessibility of the equipment within the compartment, a pair of fans 38 and 40 of the air handling or circulating equipment are suitably mounted directly to the inside of the access door 24. The access door 24 is also preferably detachably secured or mounted to the side walls 28 so as to be removable therefrom. Such detachable mounting may take any suitable form so as to be readily detachable.

The door 24 includes suitable louvered openings 42 and 44 to provide an air flow path for air flow into or out of the compartment by means of the fan 38 and 40. The fan 38 and 40 may also include suitable, detachable power cord means so that the entire assembly of access door 24 and exhaust fan 38 and 40 may be removable from the compartment area opening area to provide access thereto.

With this arrangement, the mounting of the fans 38 and 40 directly to the pivotal door 28 permits these pieces of equipment to be pivoted downward and away from the area of equipment directly therebehind to provide ready access thereto. In the event further or more convenient access is desired, the door 24 together with the fans 38 and 40 may be likewise removable to provide a more complete access to equipment therein.

The fans indicated generally at 38 and 40, each respectively include an electric motor 46 and 48 with an axial flow fan blade 50 and 52 mounted thereon. Each of the fans are detachably mounted on the inside of the door 24 in line with one of the louvered sections 42 and 44. The fans are mounted to the door by suitable mounting brackets.

The mounting brackets each respectively include a pair of clamp members 54 and 56 (only one of which can be seen) which are clamped around the cylindrical body of each of the motors 46 and 48 by means of a plurality of bolts 57 and 58.

The clamp member 54 includes a pair of legs 60 and 62 secured thereto at one end and bolted at the other end by suitable bolts 64 to the access door 24. The clamp member 56 likewise includes a pair of legs 66 and 68 extending therefrom and bolted by suitable bolts 70 and 72 to the door 24.

Thus, it is seen from the above description that I have provided an improved mounting arrangement for the mounting of equipment within an equipment compartment to provide a more efficient arrangement of the equipment as well as more ready access to the equipment within the compartment.

While the present invention has been described and illustrated by means of a simple embodiment, it is to be understood that numerous changes and modifications may be made therein without departing from the spirit and scope of the invention as defined in the appended claims.

We claim:

1. A machinery enclosure and mounting arrangement comprising:
 housing means defining an enclosed machinery compartment;
 said compartment including means for mounting machinery within said compartment;
 an access opening formed in said housing for providing access to machinery in said compartment;
 access door means pivotally secured to said housing for closing said access opening;
 said access door means being readily detachable from said housing for removal thereof from said housing;
 fan means mounted on said access door means for pivoting with said door means for providing access to said fan means and to said compartment behind said door means, removal of the door means providing removal of the fan means;
 the access door means being pivotally secured at its lower edge to said housing.

2. The apparatus of claim 1 wherein said housing comprises a vehicle cab defining an enclosed operator compartment, and wherein said machinery compartment is formed in the lower portion of at least one side of said operator compartment.

3. The apparatus of claim 2 wherein the access door means includes first and second louvered sections for providing air flow paths through said door means, and said fan means includes first and second axial flow fans detachably secured at said louvered sections of said door means.

* * * * *